United States Patent
Swensgard et al.

(10) Patent No.: US 7,828,132 B2
(45) Date of Patent: Nov. 9, 2010

(54) DUAL FUNCTION HOLDING DEVICE OPERABLE UNDER A SYSTEM POWER LOSS CONDITION

(75) Inventors: Brett E. Swensgard, West Chester, OH (US); Syed A. Hossain, Fairborn, OH (US)

(73) Assignee: Globe Motors, Inc., Dayton, OH (US)

( * ) Notice: Subject to any disclaimer, the term of this patent is extended or adjusted under 35 U.S.C. 154(b) by 745 days.

(21) Appl. No.: 11/678,963

(22) Filed: Feb. 26, 2007

(65) Prior Publication Data
US 2007/0251793 A1 Nov. 1, 2007

Related U.S. Application Data

(60) Provisional application No. 60/796,473, filed on May 1, 2006.

(51) Int. Cl.
*F16D 28/00* (2006.01)
(52) U.S. Cl. .................. 192/84.6; 192/84.7; 475/149; 310/78; 310/113
(58) Field of Classification Search ............... 192/84.6, 192/90, 84.7; 475/154, 156
See application file for complete search history.

(56) References Cited

U.S. PATENT DOCUMENTS

| 736,461 | A | * | 8/1903 | Thresher | ..................... | 318/367 |
| 3,562,565 | A | * | 2/1971 | Higashino et al. | ............. | 310/77 |
| 4,030,583 | A | * | 6/1977 | Miller | ....................... | 192/84.1 |
| 4,650,056 | A | * | 3/1987 | Sevennec et al. | .............. | 192/90 |
| 5,121,018 | A | * | 6/1992 | Oldakowski | ................. | 310/77 |
| 5,267,635 | A | * | 12/1993 | Peterson et al. | ............... | 192/90 |
| 5,353,902 | A | * | 10/1994 | Flowtow et al. | ............ | 192/84.6 |
| 5,678,671 | A | * | 10/1997 | Leimbach et al. | ........ | 192/70.22 |
| 6,808,053 | B2 | * | 10/2004 | Kirkwood et al. | .......... | 192/84.6 |

FOREIGN PATENT DOCUMENTS

| DE | 102004042638 A1 | 4/2005 |
| EP | 1400716 A1 | 3/2004 |
| WO | 2005042997 A1 | 5/2005 |

OTHER PUBLICATIONS

STIC translation of Ebert et al. (EP 1400716A1, Mar. 24, 2004).*

* cited by examiner

*Primary Examiner*—David D Le
*Assistant Examiner*—Terry Chau
(74) *Attorney, Agent, or Firm*—Stevens & Showalter LLP

(57) ABSTRACT

An electric clutch actuator capable of operating in two power loss conditions. For a condition where a normally engaged clutch is disengaged during a system power loss and the desired action is for the clutch to remain in the disengaged positional state, a holding device moves to a power off activated position to prevent movement of an actuator for the clutch. For a condition where the clutch is disengaged during a system power loss and the desired action is for the clutch to move to an engaged positional state, a motor in the electric clutch actuator is used as a generator to convert the potential energy of a clutch pressure spring into electrical energy to provide energy for powering the holding device to remain deactivated, permitting movement of the clutch actuator to the engaged position. Maintaining the holding device deactivated permits the clutch to move to the engaged position and thereby allows vehicle engine braking to be used during a power loss of the system.

19 Claims, 5 Drawing Sheets

DUAL FUNCTION HOLDING DEVICE OPERABLE UNDER A SYSTEM POWER LOSS CONDITION

CROSS-REFERENCE TO RELATED APPLICATIONS

This application claims the benefit of U.S. Provisional Application No. 60/796,473, filed May 1, 2006, which is incorporated herein by reference.

FIELD OF THE INVENTION

The present invention relates generally to a clutch actuator and, more particularly, to a clutch actuator including a holding device operable to either lock the clutch actuator to hold a clutch in an open position, or permit the clutch actuator to move the clutch to a closed position.

BACKGROUND OF THE INVENTION

In a vehicle having an electrically actuated clutch, it is desirable to be able to provide a fail safe operation mode for the clutch in the event of a power loss, such as a system power loss for supplying power to the clutch actuator. In the event of a power loss when the vehicle is stationary with the clutch disengaged or open and with the engine running, it is desirable to ensure that a power loss does not cause the clutch actuator to engage or close the clutch, which may result in the vehicle lurching forward.

Alternatively, if a power loss occurs when the vehicle is moving and the electrically actuated clutch has been disengaged, such as in the middle of a gear shift, it is desirable for the clutch to move to an engaged position. For example, when a vehicle is traveling downhill, it is desirable to provide engagement of the clutch during a power loss condition to connect the drive wheels to the engine in order for engine braking to facilitate slowing the vehicle. In such a situation, the clutch must be capable of being actuated to move from a disengaged position to an engaged position.

Accordingly, it can be seen that two opposite conditions of the clutch are required for a vehicle system power loss condition, depending on the operating state of the vehicle.

SUMMARY OF THE INVENTION

In accordance with one aspect of the invention, an actuator for a clutch is provided, the actuator comprising a motor and a drive train receiving a rotational input from the motor, where movement of the drive train actuates a clutch between engaged and disengaged positions. The actuator also includes a holding device for maintaining the actuator drive train stationary at a predetermined position in a first power loss condition and for releasing the actuator drive train for movement in a second power loss condition. The motor is driven by a rotational output of the drive train in the second power loss condition.

In accordance with another aspect of the invention, an apparatus is provided in a vehicle having a power train including a clutch located between an engine and driven wheels, the apparatus including an actuator for the clutch, the actuator comprising a motor and a power supply for powering the motor. An actuator drive train receives a rotational input from the motor, where movement of the drive train actuates the clutch between engaged and disengaged positions. A holding device maintains the drive train stationary at a predetermined position in a first power loss condition comprising loss of power from the power supply when the vehicle is stationary and the clutch is disengaged, and for releasing the drive train for movement in a second power loss condition comprising loss of power from the power supply when the vehicle is moving and the clutch is disengaged. The motor is driven by a rotational output of the drive train in the second power loss condition.

In accordance with a further aspect of the invention, an actuator for a clutch is provided, the actuator comprising a housing, a motor including a stator and a rotor, a shaft attached to the rotor of the motor, and a holding device. The holding device comprises a body including an electromagnet, where the shaft rotatably passes through the body. A holding device rotor is keyed to the shaft for rotational movement with the shaft, and the holding device rotor is supported for longitudinal movement relative to the shaft. An armature is located between the body and the holding device rotor, where the shaft passes through the armature. A spring is located between the body and the armature for biasing the armature away from the body to cause the holding device rotor to engage the housing to prevent rotational movement of the shaft. A controller is provided for controlling electrical power supplied from a power supply to the motor. The controller includes means for responding to at least one of first and second power loss conditions, where the controller maintains a control mode for driving the motor in response to the first power loss condition and the controller switches to another control mode for generating electricity from the motor in response to the second power loss condition.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
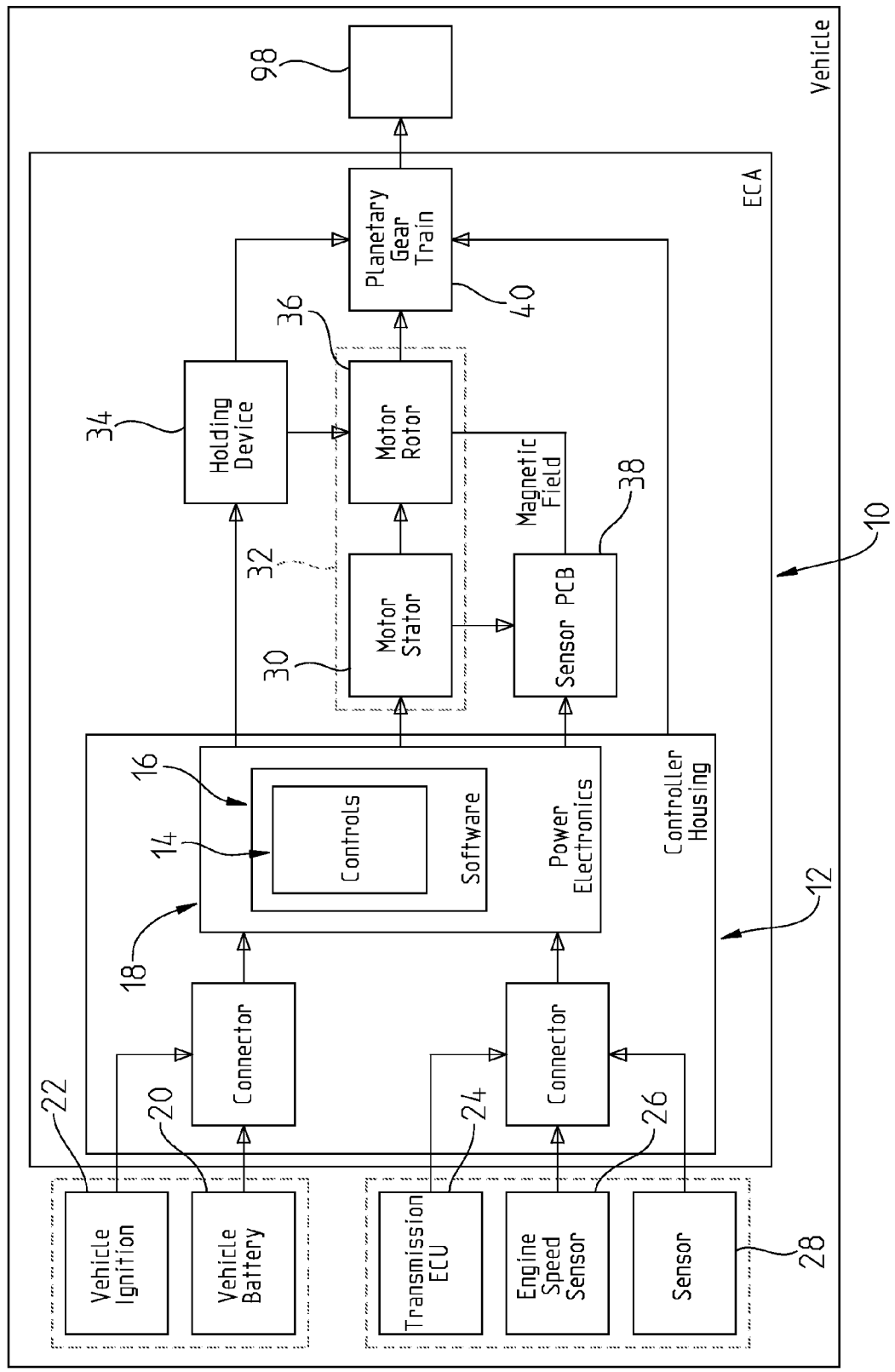
FIG. 1 is a system diagram including an electric clutch actuator of the present invention.

Referring to FIG. 1, a generalized diagram of an electric clutch actuator (ECA) 10 constructed in accordance with the principles of the present invention is illustrated. The ECA 10 is shown diagrammatically incorporated in a vehicle for controlling a clutch in a power driveline for the vehicle. The ECA 10 comprises an electronic controller 12 including controls 14, software 16 connected to the controls 14, and power electronics 18, e.g. field effect transistors (FETs), controlled by the software 16. The ECA 10 is connected to the power circuit for the vehicle including a vehicle battery 20 and vehicle ignition 22. Signals from the vehicle power train including signals from a transmission ECU 24, an engine speed sensor 26 and other sensors 28 are fed to the ECA 10 as input signals that are processed by the ECA 10 for controlling outputs of the controller 12.

The outputs of the electronic controller 12 include voltage outputs for powering a stator 30 of a DC brushless permanent magnet motor 32, a holding device 34 for operating on a motor rotor 36 of the motor 32, and a sensor circuit board 38 receiving signals indicative of the operating state of the motor 32.

The ECA 10 further includes a planetary gear train 40 receiving an output from the motor rotor 36. The planetary gear train 40 comprises a gear reducer producing an output for controlling actuation of a clutch actuator 98.

Figure 2:
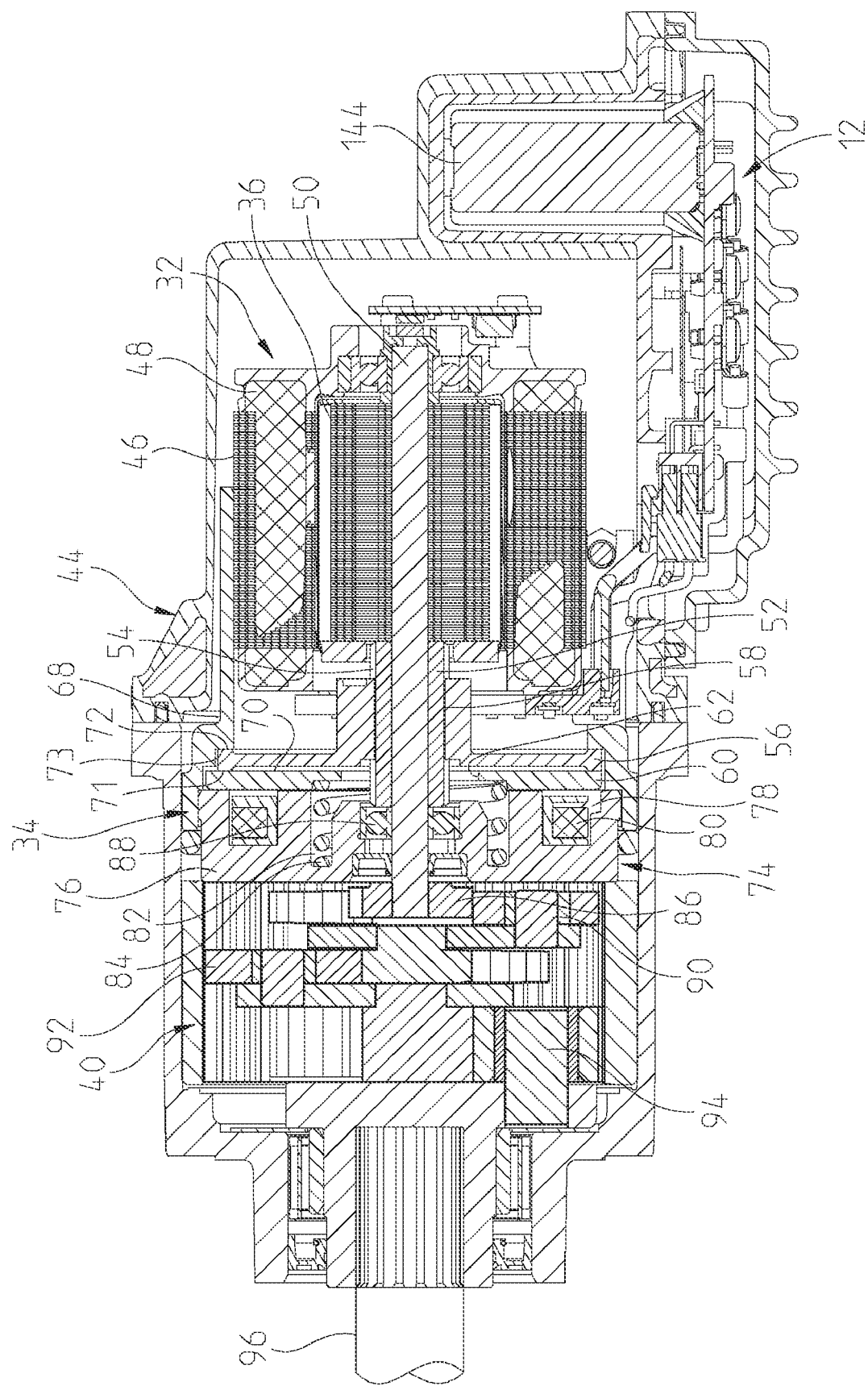
FIG. 2 is a cross-sectional view of the components of the electric clutch actuator contained within an ECA housing.

Referring to FIG. 2, the above-described components of the ECA 10 are contained within an ECA housing 44. The motor 32 includes an outer stationary portion comprising a stator stack 46 carrying wire windings 48 to define the stator 30. The motor rotor 36 is located inside the stator 30 and comprises permanent magnet sectors acted on by a magnetic field of the stator 30 created by current supplied under control of the controller 12 to produce rotation of the motor rotor 36 in a known manner. It should be understood that although the present invention is described as incorporating a brushless permanent magnet motor 32, the principles described herein may also be implemented using a brushed permanent magnet motor.

The motor rotor 36 is rigidly mounted to a rotor shaft 50 for providing a rotary output of the motor 32. The rotor shaft 50 extends through the holding device 34 including a brake housing 68 enclosing a holding device rotor 56, an armature plate 60 and a coil assembly 74. A spline member 52 is rigidly attached to the motor shaft 50 and comprises an outer surface defining a plurality of splines 54. The holding device rotor 56 is supported on the spline member 52 and includes an interior surface defining a plurality of splines 58 engaged with the splines 54 of the spline member 52. The holding device rotor 56 is axially movable along the spline member 52 and is engaged with the spline member 52 for rotation with the rotor shaft 50. The armature plate 60 is positioned next to the holding device rotor 56 and includes an aperture 62 positioned around and out of engagement with the spline member 52.

The coil assembly 74 comprises a body portion 76 mounted to the brake housing 68, and held in stationary relationship to the brake housing 68 and ECA housing 44. The body portion 76 includes a first annular region 78 containing an electromagnet comprising a coil 80, and a second annular region 82 containing a compression spring 84. One end of the spring 84 is engaged against an inner surface of the second annular region 82, and an opposite end of the spring 84 is engaged against the armature plate 60 to bias the armature plate 60 and holding device rotor 56 away from the coil assembly 74. The armature plate 60 includes an engagement surface 70 for engaging a first contact surface 71 of the holding device rotor 56, and the holding device rotor 56 further includes a second contact surface 72 for engaging a braking surface 73 of the brake housing 68. During a deactivated state of the holding device 34, the holding device rotor 56 is biased by the armature plate 60 to cause the second contact surface 72 to frictionally engage the braking surface 73 and brake or resist the holding device rotor 56 and rotor shaft 50 from rotating.

The body portion 76 is preferably formed of a magnetic material, such as a steel material, and is insulated from the coil 80. Similarly, the armature plate 60 comprises a magnetic material. The coil 80 is connected to the power electrics 18 for conducting a current through the coil 80 to create an electromagnetic field in the body portion 76 in an activated state of the holding device 34. During the activated state of the holding device 34, the armature plate 60 is drawn against the force of the spring 84 toward the body portion 76, releasing the holding device rotor 56 from frictional engagement with the brake housing 68 and releasing the rotor shaft 50 for rotational movement relative to the brake housing 68.

A sun gear 86 is fixedly attached to an end of the rotor shaft 50 distal from the motor 32, and a portion of the rotor shaft 50 adjacent the sun gear 86 passes through and is supported by a bearing 88 mounted in the body portion 76. The sun gear 86 is part of the planetary gear train 40, and provides and input rotational movement to a plurality of planetary gears in a planetary gear set 90 connected to a series of additional planetary gear sets 92, 94. The planetary gear train 40 provides a gear reduction from the rotor shaft to an ECA output shaft 96, such that the output speed of the output shaft 96 is substantially slower than the input speed of the rotor shaft 50 with an accompanying increase in output torque at the output shaft 96.

Figure 3:
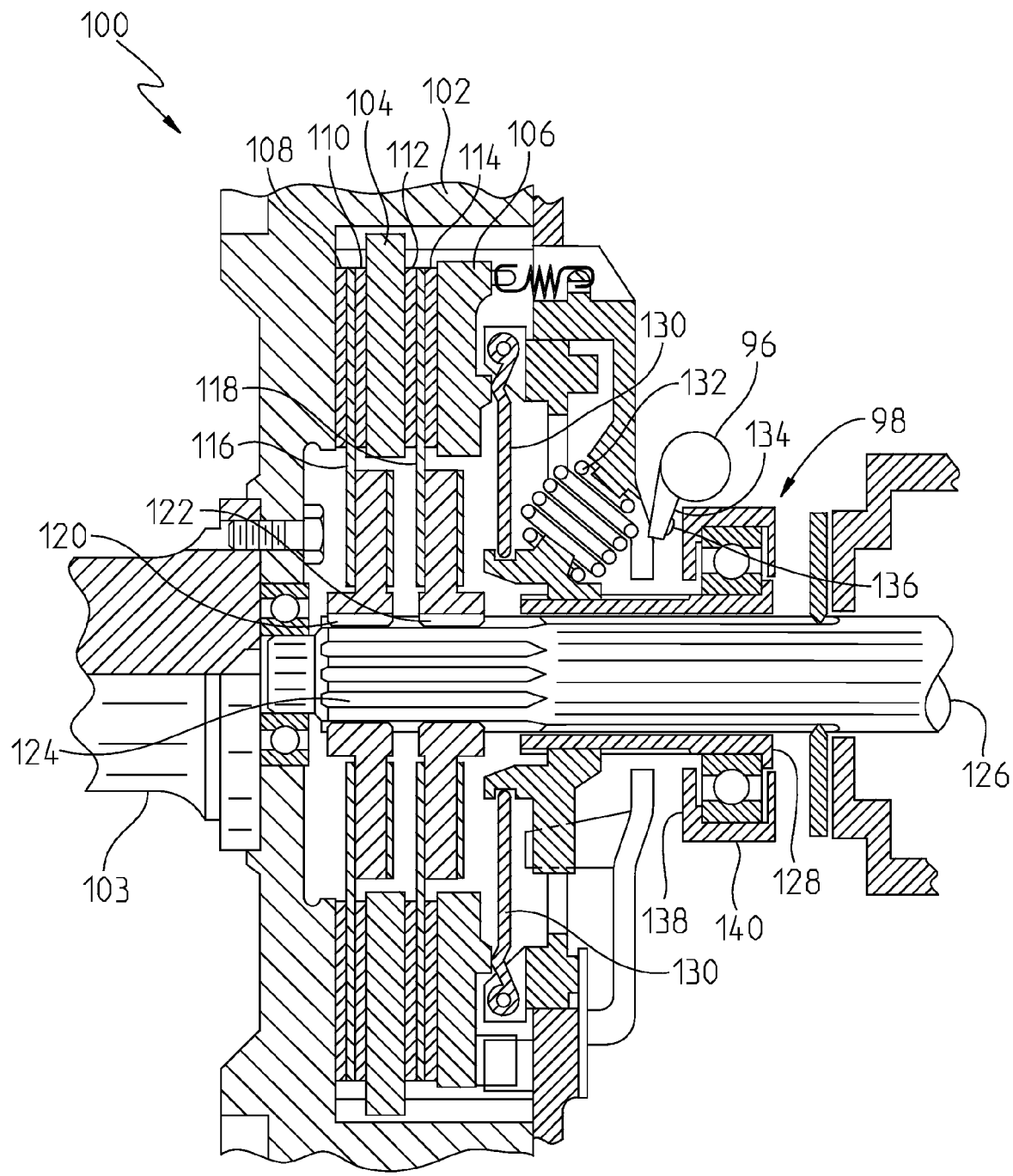
FIG. 3 is a cross-sectional view of a clutch that may be controlled with the electric clutch actuator.

Referring to FIG. 3, the output shaft 96 is connected as an input to the clutch actuator 98 for a clutch 100. The illustrated clutch 100 comprises a clutch housing 102 connected to a crankshaft 103 of an engine (not shown) for driving the clutch housing 102 in rotational movement. An intermediate plate 104 and a pressure plate 106 are supported for rotation with the clutch housing 102. The clutch housing 102 includes an engagement surface 108, the intermediate plate 104 includes a pair of engagement surfaces 110, 112 and the pressure plate 106 includes an engagement surface 114. A first driven plate 116 is located between the engagement surfaces 108, 110, and a second driven plate 118 is located between the engagement surfaces 112, 114. The first and second driven plates 116, 118 each include a respective splined passage 120, 122 for engaging a spline portion 124 of an input shaft 126.

A release sleeve 128 is supported for axial movement relative to the input shaft 126 and engages distal ends of release levers 130 mounted for pivotal movement on the clutch housing 102. The release sleeve 128 is biased toward an engagement position by a pressure spring or springs 132, causing the release levers 130 to press against the pressure plate 106, such that the driven plates 116, 118 are clamped between the respective engagement surfaces 108, 110 and 112, 114 to cause the input shaft 126 to rotate with rotation of the clutch housing 102. It should be noted that the clutch 100 is described for illustrative purposes only and the present invention is not limited to use with this particular clutch.

The clutch actuator 98 includes an actuator arm 134 that is rotated with rotation of the output shaft 96. An end 136 of the actuator arm 134 is positioned for engagement with an outer housing surface 138 of a release bearing 140 that is engaged on the release sleeve 128. When the output shaft 96 is rotated counterclockwise, as viewed in FIG. 3, the end 136 of the actuator arm engages the outer housing surface 138 to push the release sleeve 128 away from the clutch housing 102, such that the engagement surfaces 108, 110 and 112, 114 are disengaged from the driven plates 116, 118 to disengage the clutch 100. Rotation of the output shaft 96 in the opposite direction, i.e., in the clockwise direction, will result in engagement of the clutch 100.

In order for the clutch 100 to be disengaged or engaged, the holding device 34 must be activated to permit the output shaft 96 to rotate and move the clutch actuator 98. In the event of a system power loss, and in the absence of a supplemental power supply to the holding device 34, the output shaft 96 will be locked in its current position at the time of the power loss. This would typically be desirable in a first power loss condition if the vehicle is stationary with the clutch 100 disengaged, in order to prevent the vehicle from lurching forward as a result of the clutch suddenly engaging during a system power loss. On the other hand, in a second power loss condition, if the vehicle is moving during a system power loss with the clutch 100 disengaged, it would typically be desirable to allow the clutch 100 to engage in order to utilize engine braking to slow the vehicle, particularly if the vehicle is traveling downhill. As described below, the present invention provides a control for the holding device 34 and motor 32 that addresses these two system power loss conditions.

Figure 4:
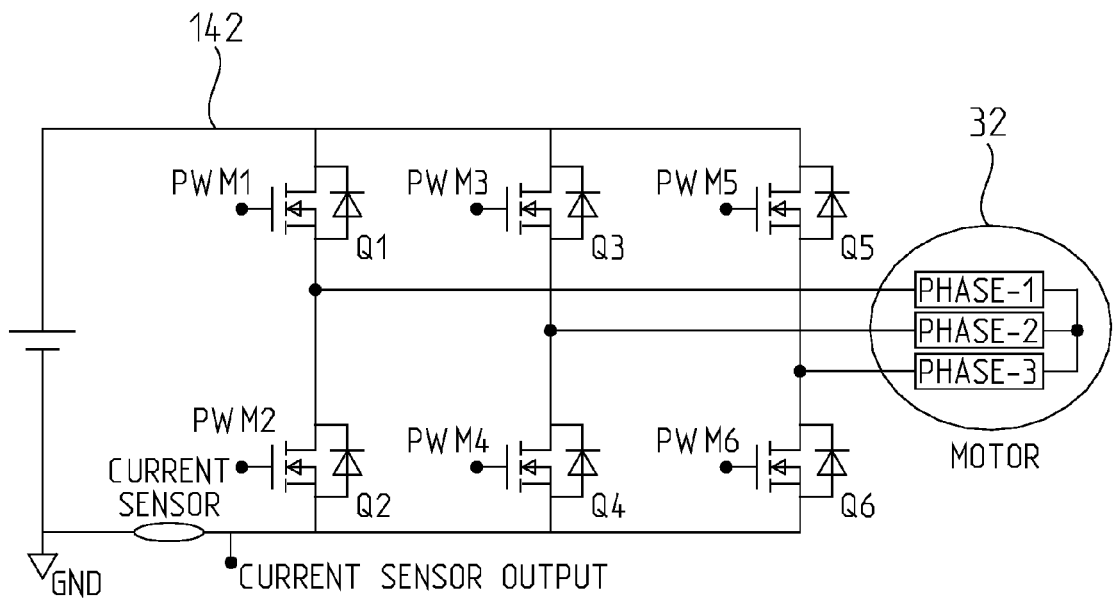
FIG. 4 is schematic of a portion of a circuit for controlling a motor in the electric clutch actuator.

Referring to FIG. 4, an inverter circuit 142 is illustrated for controlling current to the motor 32, which is illustrated as a three-phase permanent magnet brushless motor that may be controlled using a pulse width modulation (PWM) control. The circuit 142 includes three high side FETs Q1, Q3, Q5, and three low side FETs Q2, Q4, Q6 that are controlled by the software 16 to effect control of the motor 32. In the first system power loss condition, where it is desired to maintain the current position of the clutch 100, such as when the vehicle is stationary, the controller 12 operates in a mode where the three low side FETs Q2, Q4, Q6 are turned on with 100% duty cycle to short the motor terminals together. If the motor rotor 36 is rotating, a back electromotive force will be created across the motor impedance (i.e., the vector sum of resistance and synchronous reactance) as a result of the shorted terminals. The resulting circulating current in the motor windings 48 will generate a counter-reacting torque to reduce the back electromotive force. In other words, a braking torque will be generated to slow down the motor motion.

Figure 5:
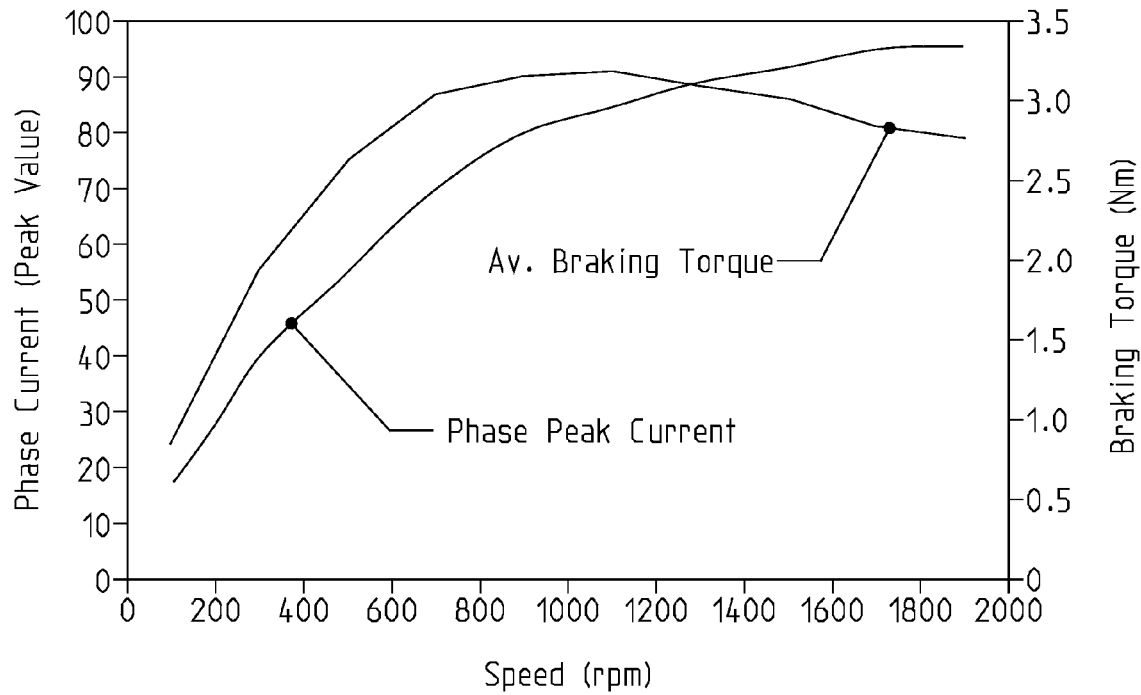
FIG. 5 is a graph of average braking torque and peak phase current of the motor at various motor speeds.

Referring to FIG. 5, an example of the average braking torque and peak phase current of the motor 32 is illustrated at various motor speeds. The peak current becomes almost saturated at high speed due to the synchronous reactance, i.e., motor angular speed×motor inductance, of the motor 32. The synchronous reactance dominates over motor resistance at high speed, such that the current becomes saturated at high speed. Accordingly, the effect of synchronous reactance allows shorting of the three motor terminals even at high motor speeds.

The holding device 34 will be deactivated during the first power loss condition where it is desired to maintain the current clutch position, and a circuit (not shown) may be provided for quickly collapsing the magnetic field generated by the coil assembly 74 of the holding device 34. If the motor rotor 36 is still rotating, the motor braking torque will slow down the motor rotor 36 to a speed where the holding device rotor 56 will further brake rotation of the motor rotor 36 and hold the rotor shaft 50 against further rotation. That is, the holding device rotor 56 will hold the rotor shaft 50 fixed in position to maintain the output shaft 96 and actuator 98 in a disengagement position, operating against the pressure spring 132 to maintain the release sleeve 128, and thus the clutch 100, in the disengagement position.

In the second system power loss condition where it is desired to move the clutch 100 from the disengaged to the engaged position, such as when the vehicle is moving, the controller 12 operates in a mode where the three low side FETs Q2, Q4, Q6 will be turned on to short the motor terminals together for a predetermined braking portion ($D_B$) of a duty cycle, and all FETs will be turned off for a remaining regenerative portion ($D_R$) of the duty cycle, i.e., during a portion of the duty cycle equal to $1-D_B$. As described in further detail below, during the second power loss condition, provision is made for activating the holding device 34 to release the rotor shaft 50 for rotation for a period of time sufficient to allow the clutch 100 to engage. During the period of rotation of the rotor shaft 50, braking torque will be applied from the motor 32 during the braking portion of the duty cycle $D_B$, in a manner similar to that described for the first power loss condition, and regenerative energy will be provided from the motor 32 during the remaining regenerative portion $D_R$ of the duty cycle.

The ECA controller bus includes a controller bus capacitor 144, see FIG. 2, for maintaining a stored amount of energy during normal powered operation of the ECA controller 12, and for receiving and storing the regenerative energy from the motor 32 during the regenerative portion $D_R$ of the duty cycle. The energy stored in the capacitor 144 is utilized to provide power to the ECA controller 12 and to the holding device 34 during a system power loss condition. The capacitor 144 is capable of storing sufficient energy, including the additional regenerative energy received from the motor 32, to maintain the holding device 34 in the activated state for rotation of the output shaft 96 and clutch actuator 98 to the engagement position for engagement of the clutch 100. That is, during rotation of the output shaft 96 and rotor shaft 50, as the clutch 100 moves toward the engagement position under the force of the spring(s) 132, the motor rotor 36 will rotate to produce regenerative energy supplied to the capacitor during the regenerative portion $D_R$ of the duty cycle. The regenerative energy will continue to be contributed to any energy already stored in the capacitor 144 to maintain the holding device 34 in the activated state, permitting continued rotation of output shaft 96 and clutch actuator 98 until the clutch 100 is fully engaged at the end of the travel of the release sleeve 128 under the influence of the stored energy in the spring(s) 132.

Figure 6:
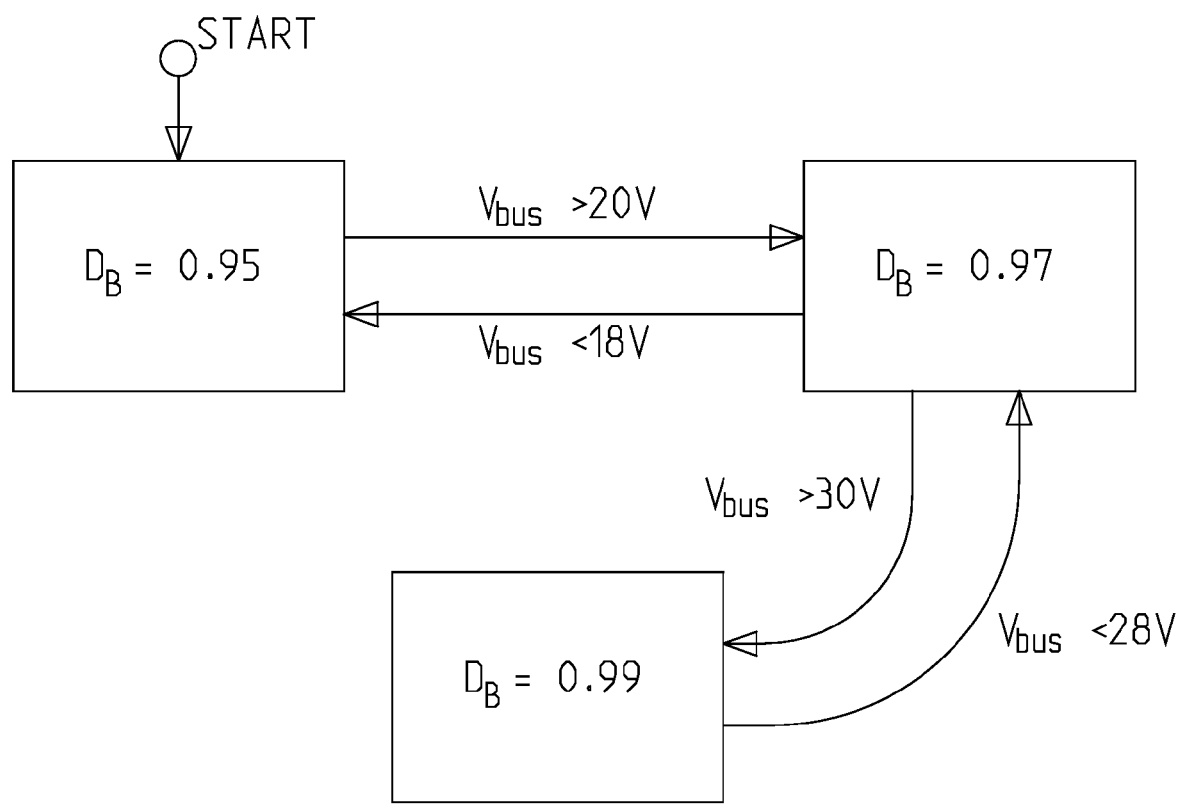
FIG. 6 is a state diagram for controlling the duty cycle switching performed by the circuit of FIG. 4 based on measured bus voltage.

The bus voltage $V_{bus}$ may be increased or decreased based on the balance between the supplied regenerative energy and the amount of power required to activate the holding device 34 and operate the ECA controller 12. Referring to FIG. 6, a state diagram is shown for controlling the duty cycle based on the measured bus voltage, $V_{bus}$. In particular, the brake portion $D_B$ of the duty cycle is initially set to 0.95 ($D_R$=0.05) at the beginning of the second power loss condition. If $V_{bus}$ is greater than 20V, then $D_B$ is increased to 0.97 with a corresponding decrease in the regenerative portion $D_R$ of the duty cycle to 0.03. If $V_{bus}$ falls below 18V when $D_B$ is set to 0.97, then $D_B$ will again be set to 0.95. If $V_{bus}$ is greater than 30V when $D_B$ is set to 0.97, then $D_B$ is increased to 0.99 with a corresponding decrease in the regenerative portion $D_R$ of the duty cycle to 0.01. If $V_{bus}$ falls below 28V when $D_B$ is set to 0.99, then $D_B$ is again set to 0.97.

It can be seen that the ECA 10 is capable of meeting the two power loss conditions described above. For the power loss condition where the clutch 100 is disengaged during a system power loss and the desired action is for the clutch 100 to remain in its current positional state, the holding device 34 will move to its power off deactivated position to prevent movement of an actuator 98 for the clutch 100. For the power loss condition where the clutch 100 is disengaged during a system power loss and the desired action is for the clutch 100 to move to an engaged positional state, the ECA motor 32 is used as a generator to convert the potential energy of the clutch pressure spring(s) 132 into electrical energy to provide energy for powering the holding device 34 to remain activated. Maintaining the holding device 34 activated permits the clutch 100 to move to the engaged position and thereby allows vehicle engine braking to be used during a power loss of the system.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An actuator for a clutch in a power driveline of a vehicle, said actuator comprising:
   a controller;
   at least one sensor providing a signal from the power driveline to the controller;
   a power source connected to said controller for providing electrical power to said controller:
   a motor;
   a drive train receiving a rotational input from said motor, where movement of said drive train actuates the clutch between engaged and disengaged positions;
   a holding device for maintaining said drive train stationary at a predetermined position with said clutch disengaged in a first power loss condition;
   said controller including voltage outputs for powering said motor and said holding device;
   said controller configured to receive a signal from said at least one sensor indicating a condition of said vehicle being stationary, and said controller configured to prevent power from being supplied to said holding device to maintain said drive train stationary at the predetermined position with said clutch disengaged in said first power loss condition when power is discontinued from said power source; and
   said controller configured to receive a signal from said at least one sensor indicating a condition of said vehicle moving, and said controller configured to provide power to said holding device to permit said drive train to move to position said clutch in said engaged position when power is discontinued from said power source corresponding to a second power loss condition.

2. The actuator of claim 1, wherein said drive train operates against a clutch spring in said clutch during said rotational input from said motor, and said clutch spring provides a motive input to said drive train in said second power loss condition.

3. The actuator of claim 1, wherein said holding device is operated by an electromotive force, and said motor produces an electrical power output in said second power loss condition to maintain said holding device in a released state, permitting rotation of said drive train.

4. The actuator of claim 3, including the controller for controlling electrical power supplied from the power source to said motor, said controller switching from a control mode for supplying electrical power to said motor to another control mode for generating electricity from said motor in response to said second power loss condition.

5. The actuator of claim 1, wherein said holding device includes a rotatable rotor that is spring biased into engagement with a stationary portion of said actuator to maintain said drive train stationary.

6. The actuator of claim 5, wherein said holding device includes an electromagnet that is energized to release said rotor for rotation, permitting movement of said drive train.

7. The actuator of claim 6, wherein said motor generates electrical power for energizing said electromagnet during said second power loss condition.

8. The actuator of claim 7, wherein said electromagnet is energized during a normal powered operating condition of said motor, where said motor is powered to actuate said clutch between engaged and disengaged positions.

9. The actuator of claim 1, including a capacitor configured to provide power to said holding device during said second power loss condition.

10. In a vehicle having a power train including a clutch located in a power driveline between an engine and driven wheels, an actuator for said clutch comprising:
    a controller;
    at least one sensor providing a signal from the power driveline to the controller;
    a power supply connected to said controller for providing electrical power to said controller;
    a motor;
    said power supply providing power to said motor;
    a drive train receiving a rotational input from said motor, where movement of said drive train actuates said clutch between engaged and disengaged positions;
    a holding device for maintaining said drive train stationary at a predetermined position in a first power loss condition comprising loss of power from said power supply when said vehicle is stationary and said clutch is disengaged, and for releasing said drive train for movement in a second power loss condition comprising loss of power from said power supply when said vehicle is moving and said clutch is disengaged; and
    said motor being driven by a rotational output of said drive train in said second power loss condition;
    said controller configured to receive a signal from said at least one sensor indicating a condition of said vehicle being stationary, and said controller configured to prevent power from being supplied to said holding device to maintain said drive train stationary at the predetermined position with said clutch disengaged in said first power loss condition when power is discontinued from said power supply; and
    said controller configured to receive a signal from said at least one sensor indicating a condition of said vehicle moving, and said controller configured to provide power to said holding device to permit said drive train to move to position said clutch in said engaged position when power is discontinued from said power supply corresponding to the second power loss condition.

11. The actuator of claim 10, wherein said clutch moves from said disengaged position to said engaged position during said second power loss condition.

12. The actuator of claim 11, wherein said drive train operates against a clutch spring in said clutch during said rotational input from said motor, and said clutch spring provides a motive input to said drive train in said second power loss condition.

13. The actuator of claim 10, wherein said holding device includes a rotatable rotor that is spring biased into engagement with a stationary portion of said actuator to maintain said drive train stationary.

14. The actuator of claim 13, wherein said holding device includes an electromagnet that is energized by said power supply to release said rotor for rotation, permitting movement of said drive train.

15. The actuator of claim 14, wherein said motor generates electrical power for energizing said electromagnet during said second power loss condition.

16. The actuator of claim 10, including a capacitor configured to provide power to said holding device during said second power loss condition.

17. An actuator for a clutch in a power driveline of a vehicle, said actuator comprising:
- a housing;
- a motor including a stator and a rotor;
- a shaft attached to said rotor of said motor;
- a holding device comprising:
  - a body including an electromagnet, said shaft rotatably passing through said body;
  - a holding device rotor keyed to said shaft for rotational movement with said shaft, said holding device rotor being supported for longitudinal movement relative to said shaft;
  - an armature located between said body and said holding device rotor, said shaft passing through said armature; and
  - a spring located between said body and said armature for biasing said armature away from said body to cause said holding device rotor to engage said housing to prevent rotational movement of said shaft;
- a controller configured to control electrical power supplied from a power supply to said motor and to said holding device;
- said controller including means for responding to at least one of first and second power loss conditions, each of said power loss conditions comprising a loss of electrical power supplied from said power supply to said motor and said holding device;
- said controller configured to maintain a control mode for maintaining said shaft stationary in response to said first power loss condition;
- said controller configured to switch to another control mode for generating electricity from said motor in response to said second power loss condition;
- said actuator being connected to the clutch including a clutch spring biasing said clutch to an engaged position, and rotation of said shaft causes movement against the force of said clutch spring to disengage said clutch;
- said first power loss condition comprises said vehicle being stationary with said clutch disengaged and said second power loss condition comprises said vehicle moving with said clutch disengaged; and
- wherein said clutch spring is operable to cause said shaft to rotate in said second power loss condition for said motor to generate electricity, and said controller is configured to direct said electricity generated by said motor to said electromagnet of said holding device to release said shaft for rotation.

18. The actuator of claim 16, wherein said controller is configured to prevent power from being supplied to said holding device to prevent said shaft from rotating during said first power loss condition.

19. The actuator of claim 17, including a capacitor configured to provide power to said holding device during said second power loss condition.

* * * * *